United States Patent [19]
Fujii et al.

[11] Patent Number: 5,741,589
[45] Date of Patent: Apr. 21, 1998

[54] CONSTRUCTION MATERIAL MADE OF WOODY MATERIAL AND MORTAR

[75] Inventors: Tsuyoshi Fujii; Atsushi Miyatake, both of Ibaragi-ken, Japan

[73] Assignee: The Forestry and Forest Products Research Institute, Ibaragi-ken, Japan

[21] Appl. No.: 623,213

[22] Filed: Mar. 28, 1996

[51] Int. Cl.$^6$ .................... D02G 3/00; E04C 3/330; B32B 3/00

[52] U.S. Cl. .................... 428/370; 428/57; 428/114; 428/106; 52/730.7; 52/737.3; 52/730.1

[58] Field of Search .................... 428/106, 114, 428/113, 370, 703, 296, 57; 162/94; 144/358, 359; 52/730.1, 730.7, 737.3

[56] References Cited

U.S. PATENT DOCUMENTS

| | | |
|---|---|---|
| 1,329,292 | 1/1920 | Christin . |
| 1,420,220 | 1/1922 | Roux . |
| 3,289,371 | 12/1966 | Pearson et al. . |
| 3,400,507 | 9/1968 | MacChesney . |
| 3,819,466 | 6/1974 | Winfield et al. ............ 161/89 |
| 3,857,217 | 12/1974 | Reps ............ 52/589 |
| 4,144,685 | 3/1979 | Fox ............ 52/233 R |
| 4,799,961 | 1/1989 | Friberg ............ 106/93 |
| 5,021,093 | 6/1991 | Beshay ............ 106/731 |
| 5,047,086 | 9/1991 | Hayakawa et al. ............ 106/731 |
| 5,167,710 | 12/1992 | Leroux et al. ............ 106/711 |
| 5,196,061 | 3/1993 | Thomas et al. ............ 106/697 |
| 5,397,067 | 3/1995 | Akiyama ............ 241/28 |
| 5,441,787 | 8/1995 | Fujii et al. ............ 428/57 |
| 5,505,238 | 4/1996 | Fujii et al. ............ 144/2 R |

FOREIGN PATENT DOCUMENTS 193161 8/1991 Japan .

*Primary Examiner*—Newton Edwards
*Attorney, Agent, or Firm*—Barry R. Lipsitz; Ralph F. Hoppin

[57] ABSTRACT

A woody group material and cement are combined to form a construction material. The material has an aggregate of finely split pieces formed by splitting wood, bamboo or the like in a fiber direction. The split pieces are formed in one or more layers and are surrounded by, and buried in, a mortar. A construction material can be provided which is fire resistant and has a strength comparable to a lumbered product such as wood material obtained by cutting raw wood. The finely split pieces of wood, bamboo or the like are very strong and tough because they closely adhere to the mortar. Moreover, it is possible to use a fiber structure of raw material. Since the finely split pieces can use a small diameter wood, lumbering byproducts, and other waste material, it is possible to achieve effective use of forest resources and low manufacturing costs. Further, the product can realize various strength and fire resistance properties for applications as a wall material or other structural material by changing the sort of finely split pieces, shape and size, and mortar ratio. The product can therefore be tailored to meet various construction needs.

17 Claims, 9 Drawing Sheets

CONSTRUCTION MATERIAL MADE OF WOODY MATERIAL AND MORTAR

BACKGROUND OF THE INVENTION

The present invention relates to a construction material, manufacturing method and apparatus thereof made by solidifying an aggregate formed by fine pieces split the woody material such as wood, bamboo or reed to a fiber direction by a mortar.

As it is well known, the wood has been widely used from old days since it had an advantage that it is easy to get and easy to process as well as a reproduction is possible. However, in concomitant with increase of world population and improvement of life level, a using amount of woods are remarkably increased, a requirement for woody material is also made to be high and various. To this end, in addition to a conventional product, woody group raw material such as aggregate material, single board piled material LVL plywood, particle board, fiber board, wood piece cement board, and wood fluff cement board as described above is developed.

The so-called product having been used from old days was made from a log having a diameter more than ordinarily 100 mm, a yield from stem portion of standing tree decreases to 50–80%, and a yield from whole of the standing tree including branch portions to 30–50%. And, the lumbered product may include joints in many cases, but such a lumbered product having the joints is decreased to 40–60% in strength relative to the strength (a strength peculiar to wood) of the lumbered product having no joint.

The aggregate material has been offered to solve a problem of strength decrease causing from the joint possessed by many lumbered product, and its strength is improved to about 60–75% of a strength peculiar to wood. However, many parts of the wood are spent out in a cutting process for obtaining a plate material as a raw material of the aggregate material, and the yield from stem portion of the standing tree is decreased to about 30–40%.

The single board piled material LVL is one that a single board is made by peeling off the log and then cutting to a predetermined size form so as to arrange the wood grain to same direction whereby piling by an adhesive agent. And, the plywood is one that aforesaid single boards are made to be crossed alternately and piled by an adhesive agent.

By the way, since the manufacturing of such a single board is carried out as likely to do by thinly peeling out from a log by an apparatus such as rotary lathe without being cut by a saw, there are none of generation such as so-called sawdust. Accordingly, a yield from the stem portion of the standing tree is improved to 60–70%, and one which is same degree with aforesaid aggregate material in strength also can be obtained.

However, since the single board is manufactured by turning the log, the log capable of utilizing as a raw material is limited to one having a large diameter.

The particle board is one that a wood particle manufactured by using various kinds of crushing device is applied with adhesive agent so as to be molded and solidified to a plate form. Since greater part of wood material can be made to product, the yield from the raw wood comes to 90%.

But, since the lengthes of small wood pieces are less than 50 mm and besides it is difficult to mold by arranging the wood grain, only a strength of ⅔–½ can not but be obtained relative to the lumbered wood product, and a Young's coefficient is also about ½ of the lumbered wood product.

The fiber board is one that a tip crushed the wood is made to be a fiber state by a fiber dissolving device, and these fibers are bundled whereby molded and solidified by adhesive agent. The yield from the raw wood comes to 90%, but its strength is equal or about ⅓ relative to the lumbered wood product although it depends on the conditions, and a Young's coefficient is about ⅓ of the lumbered wood product.

Aforementioned lumbered wood product, aggregate, and single layer piled material LVL are mainly used as a structural material and an interior or exterior finishing material of house, and the plywood, particle board and fiber board are mainly used as a basic material.

However, for these woody group construction material, in addition to aforementioned problems, following disadvantages are included.

That is, they include inevitable problems that they have a flammability, so in case when a fire is occurred, they would be burnt out. To this end, in many cases, it is a situation that its use at population collective area is limited.

Those which are developed for solving such a disadvantage and also improving a yield from the raw material, are a wood piece cement board and a wood fluff cement board.

The wood board cement board is one that a wood waste pieces produced by a planer process, equal amount of cement and water are mixed whereby pressed and molded.

And, the wood fluff cement board is one that a log in diameter of 10–30 cm is cut out to a helical state of wood fluff of 30–50 cm length, 3–5 mm width, and 0.3–0.5 thickness by using a wood fluffing device, and these wood fluffs are solidified and molded by mixing and stirring with cement and water.

These wood piece cement board and the wood fluff cement board both have fire resistivity and a yield from the raw material is also high, but they have problems in their strengths, and they have nothing but having a strenth that former has ⅕ of strength of the lumbered wood product, and similarly latter has ¹⁄₁₀.

As described above, a wood material or aforementioned construction material utilized with wood material has problems that they are lack in fire resistivity, lack in strength relative to a conventional lumbered wood product, low in yield from the wood material being a raw material, and need a raw wood of large diameter as a raw material.

SUMMARY OF THE INVENTION

The present invention is directed to solve aforementioned problems.

The woody strand cement board in accordance with the present invention is made such that finely splited pieces aggregate is formed which becomes to a bone structure of cement board by adhering single layers made by arranging in parallel the finely splited pieces formed by splitting a wood, bamboo, reed or other raw material to a direction parallel to fibers to its lengthwise, to a horizontal direction and vertical direction in multiple, and this finely split pieces aggregate is solidified and molded by cement, sand and water at a pressed state.

In above described woody strand cement board, an adhered portion of horizontal direction of above mentioned each single layer is provided to a position which does not superpose in a piling direction of the single layer.

And, a manufacturing method of the woody strand cement board in accordance with the present invention comprises:

(a) a process for cutting a woody material such as wood, bamboo, and reed to a predetermined length, (b) a process for obtaining a split piece by splitting the woody material which is cut to a predetermined length along with fiber direction, (c) a process for obtaining a finely split pieces by further finely splitting the split piece obtained at aforesaid process, (d) a process for pouring in a mortar to a single layer formed by spreading the finely split pieces side by side within a molding frame, (e) a process for repeating in turn aforesaid process (d), piling the single layers into the mold frame in multiple stages, covering each finely split piece with mortar, and obtaining a finely split pieces aggregate of a state that a mortar is filled to gaps defined with each finely split piece, (f) a process for vibrating by laying a upper lid plate on top surface of the finely split pieces aggregate obtained at aforesaid process (e), and de-bubbling and at the same time closely contacting the finely split piece and the mortar, and subsequently (g) a process for applying a pressure to the upper lid plate, and pressing and tightening up to the mortar would be made to a semi-hardened state, and (h) a process for releasing the pressed tightening and then preserving until the mortar would be made to a predetermined hardness.

In above manufacturing method, there may be a thing to spread a mixture of cement and sand to a single layer spread with water instead of the mortar.

Further, the manufacturing apparatus of the present invention comprises:

a finely split pieces forming means for splitting a woody material such as wood, bamboo or reed to a direction parallel to fiber, a means for molding and solidifying by pouring a mortar by piling the layers formed by spreading aforesaid finely split pieces, a first means for forming the single layers by feeding the finely split pieces from aforesaid finely splited piece forming means to aforesaid molding and solidifying means, a second means for forming the single layer by spreading the finely split pieces to a direction crossing with the finely split piece of single layer formed by aforesaid first means, and a means for vibrating and pressing the finely split piece in aforesaid molding and solidifying means and the mortar poured thereto.

DETAILED DESCRIPTION OF THE INVENTION

Hereinafter, a preferred embodiment of the present invention will be described more in detail with reference to the accompanying drawings. In this embodiment, willow, large bamboo, hemp, waste material of house are used as a raw material, and the woody strand cement board is manufactured by each raw material independently, but it is a matter of course that it is good to mix these raw materials.

Figure 1:
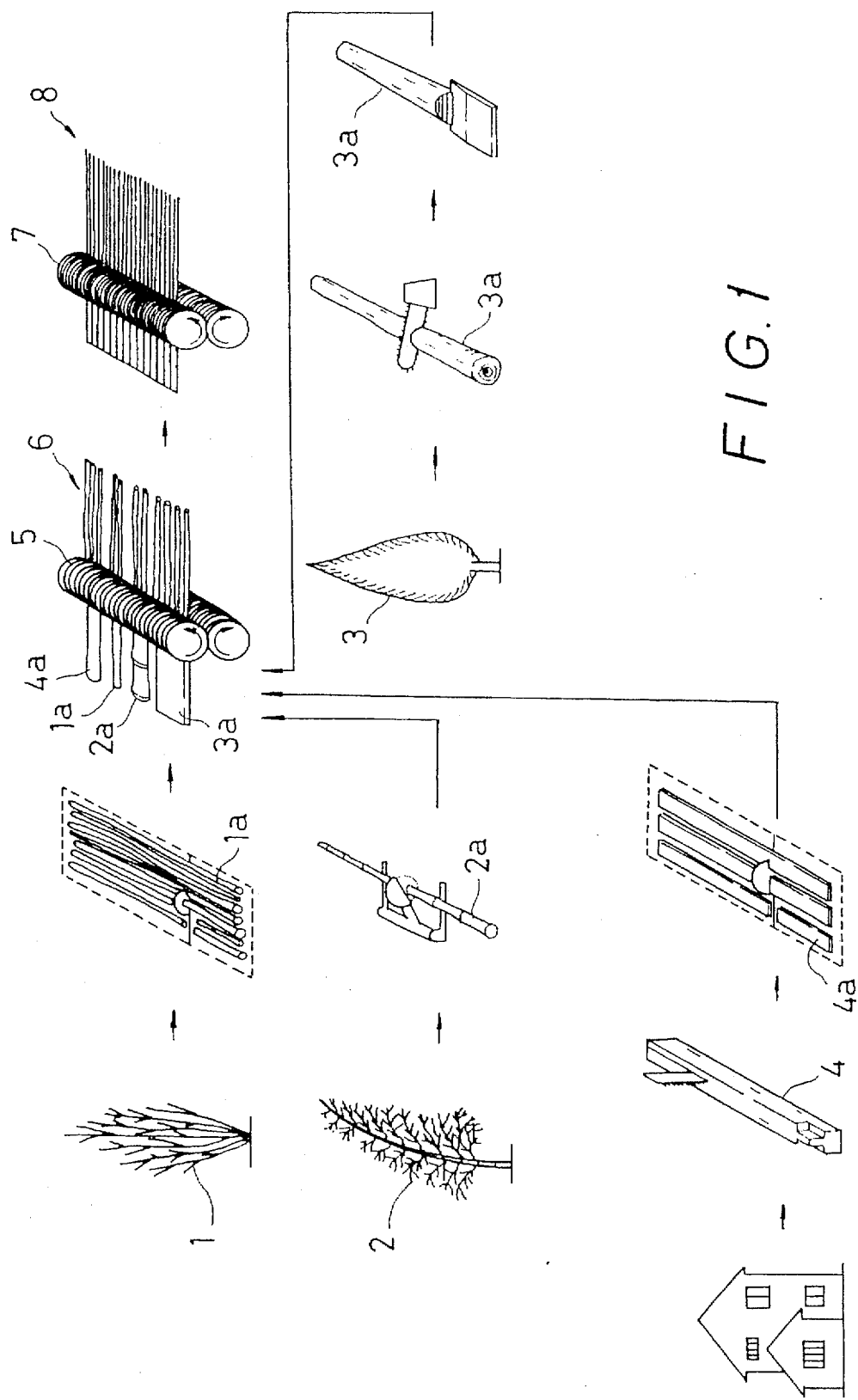
FIG. 1 is a schematic diagram for illustrating a manufacturing process of a finely split piece, FIGS. 2(aa) and 2(b) are perspective views for illustrating a piling process of the finely split pieces and mortar.

In FIG.1, a reference numeral symbol 1 is a small diametral wood (20–50 mm diameter) of willow, a numeral 2 is a large bamboo of 20–100 mm in diameter, a numeral 3 is a hemp, a numeral 4 is a waste material produced by dismantling a house and the like, and the large bamboo 1 and willow 2 are obtained as a predetermined size material 1a, 2a respectively by cutting to a length of 600 mm by a rotary saw. And, the hemp 3 and the waste material 4 are cut to a length of 600 mm and then further cut to a board of 25 mm thickness whereby a predetermined size materials 3a, 4a are obtained. Successively, respective predetermined size materials according to aforesaid raw material is split by a hereinafter saying splitting device 5 whereby a split piece 6 of 10 mm in thickness is made. The split piece 6 obtained by doing like this is further finely split by a finely splitting device 7 whereby becomes to a finely split pieces 8 of 4 mm×10 mm in section. Further, here the raw material less than 600 mm is also used by splitting. And, the finely split piece 8 is manufactured by utilizing an apparatus of U.S. Pat. No. 5,805,238, issued Apr. 9, 1996.

Figure 2A:
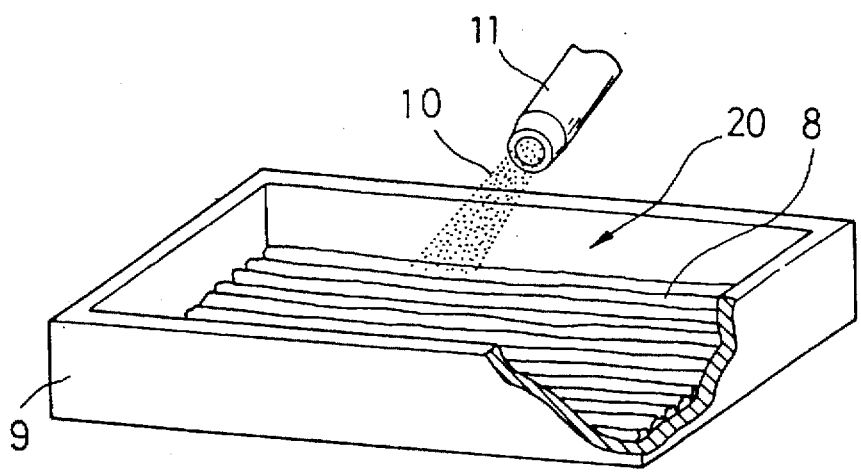
Figure 2A:

In FIG.2, a reference numeral 9 is sized to 600 mm×300 mm crosswise and lengthwise and it is a molding frame of steel made having a predetermined depth, and a single layer is formed by spreading the finely split pieces 8 obtained at aforesaid process to bottom of this molding frame 9 by arranging in the fiber directions. Successively, a mortar 10 sent from a mortar tank not shown is jetted from a nozzle 11 and spread to whole of the single layer 81.

Composition of the mortar spread to the single layer 81 is based on a cement 1, sand 1, water 0.5 (weight ratio), but water quantity is controlled in response to a moisture containing rate of the finely split piece 8. Further, the spread amount of the mortar is same as the volume of the single layer 81.

Further, in case when a tree bringing a obstacle to a hardening of cement such as hemp is used for a raw material of the finely split pieces 8, a calcium chloride and the like is added to the mortar (about 1% of cement weight).

Figure 2B:
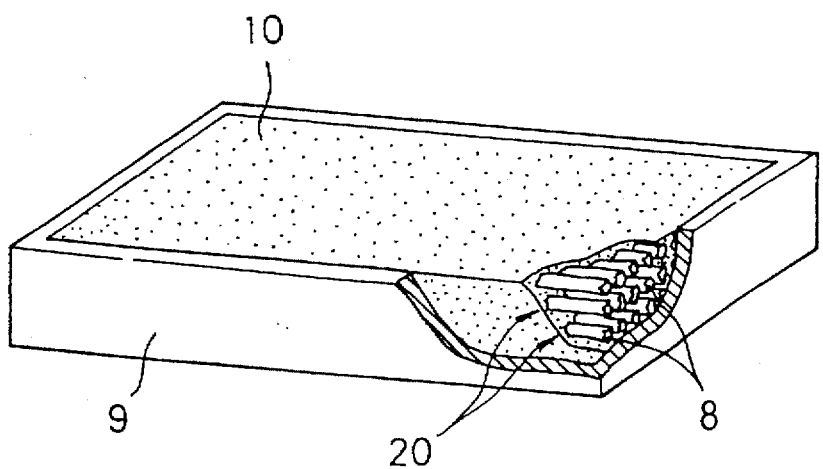
Figure 3A:
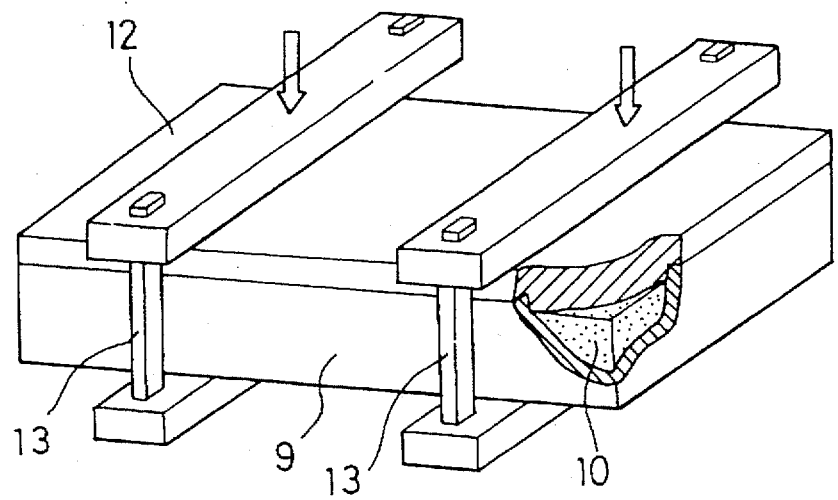
FIGS. 3(a) and 3(b) are perspective views for illustrating a pressing and drying process.

By repeating in turn the spreading of the mortar and a formation of single layer, a single layer spread with mortar is piled up to become a predetermined thickness into the molding frame 9 (FIG. 2(b). Further, the mortar is added in response to requirement, and it is made to sufficiently cover each single layer of piled state with the mortar. At a time point that the piled layers are completed by doing this, as shown in FIG. 3(a), a pressing and tightening plate 12 is set to the molding frame 9. Successively, a vibration is applied to the molding frame 9 by a vibration applying machine which is not shown. By this vibration, a bubble occurring at mortar interior, or gap between the mortar and the finely split piece is eliminated, and a close contact of the mortar 10 and the finely split piece 8 is properly obtained.

Next, a pressure is applied to the mortar within the molding frame 9 and to the finely split piece 8 as shown by the arrows in FIG. 3(a). This pressure application is done by a pressure applying means not shown via the pressing and tightening plate 12, but in this embodiment, a pressure of 5–10 kgf/cm is applied. The applied pressure is held for two days by a cramp 13, and then the pressure is released. At this time point, the woody strand cement board in which the mortar is still semi-hardened state is obtained.

Figure 3B:
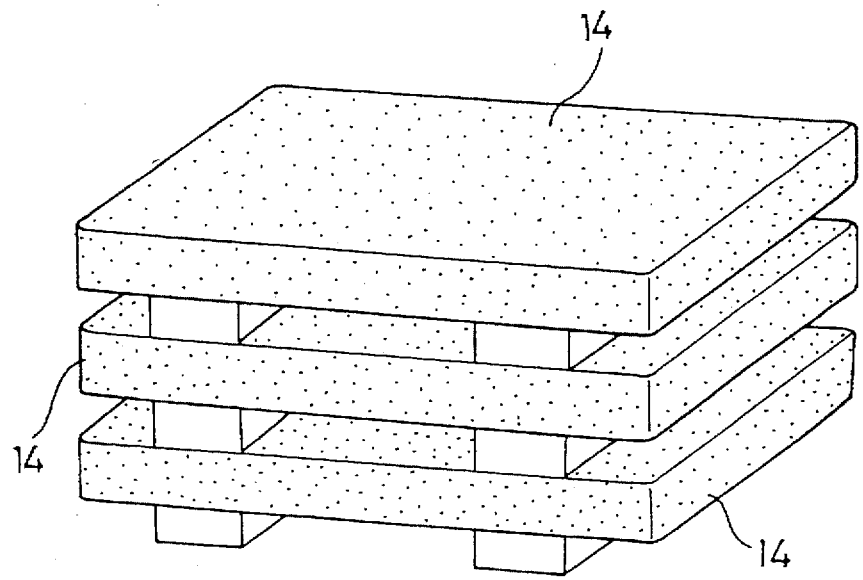

And, as shown in FIG. 3(b), aforesaid woody strand cement board 14 is naturally dried in atmosphere for about one month until the mortar would be completely hardened. Thus, a woody strand cement board can be obtained in which the mortar has completely hardened and having a predetermined strength.

Next, other embodiments will be described in response to the requirement in reference to FIGS. 1, 2 and 3. In aforementioned embodiment, the coupling of the finely split pieces each other structuring the single layer as well as the single layers each other are executed by spreading the mortar and hardening thereof, but in following embodiment, instead of spreading the mortar, a cement and sand are spread.

First, according to a process shown in FIG.1, a finely split piece having a size of 4 mm×10 mm in section and approximately 60 mm in length is manufactured. These finely split pieces are spread at bottom portion of the molding frame 9 in a direction parallel to fiber whereby forming a single layer {FIG. 2(a)}, and adequate amount of water is spread thereto. Aforementioned water spreading is not required in case when a tree or bamboo and the like more than 100% of moisture content rate is used for the raw material of finely split pieces. Further, in case of requiring the water spreading, about ½ of cement weight is adequate quantity for a water spreading amount.

Subsequently, a mixture of cement and sand is spread on said single layer from a nozzle 11. The mixing rate of cement and sand is 1 of cement and 1–0.5 of sand (weight ratio), and the spreading quantity to single layer is ½–⅔ of volume of the single layer.

And, in case when a hemp and the like is used for a raw material of the finely split pieces, since an obstacle is occurred to the hardening of the cement, a calcium chloride should be added to water or cement to be spread.

As described above, single layers are piled until to reach a predetermined thickness by repeating a formation of single layer, water spreading, and a spreading of mixture of cement and sand, within the molding frame 9. Successively, as shown in FIG. 3(a), the pressing and tightening plate 12 is set on top surface of the molding frame 9 and applying a pressure (10–20 kgf/cm²), and this pressure is maintained for about 2 days to one week by a clamp 13. At a time point that this process is finished, a woody strand cement board of a state that the cement is half hardened is obtained. After the woody strand cement board of a state that the cement is half hardened made as this is naturally dried for about two weeks in atmosphere, it is set within the molding frame 9 spread with mortar at bottom, and further a mortar is spread from top whereby forming a mortar layer to whole surface of the cement board. The composition of the mortar is cement 1, sand 1, water 0.5 (weight ratio), and an amount of mortar used is ½–⅓ of total quantity of the finely split pieces (volume ratio).

Subsequently, a pressure (10–20 kgf/cm²) is applied via the pressing and tightening plate, and this pressure is maintained for 2 days—one week by a clamp, and then naturally dried for about one month, and thereby a woody strand cement board as a completed product is obtained.

By the way, in aforementioned each embodiment, each single layer has a case to pile so as to cross the fiber direction of the finely split pieces. By piling the single layers as this, a product having more strength can be obtained. And, in case when the length of each finely split piece is short, the single layer is formed by spreading in random with ignoring the fiber directions. And, it is also good if a single layer formed by arranging a fiber direction of the finely split pieces and a single layer spread the finely split pieces in random are alternately piled. And, in aforementioned embodiment, since the length of a single layer is 600 mm being same as the molding frame, it will be good if piling one single layer. However, in order to manufacture a product having a length more than this, it is required to pile by joining the single layers to lengthwise. In this case, when it is made so as to make said joining portion not to be matched each other in a piling direction, a product having a high strength can be obtained.

Figure 4A:
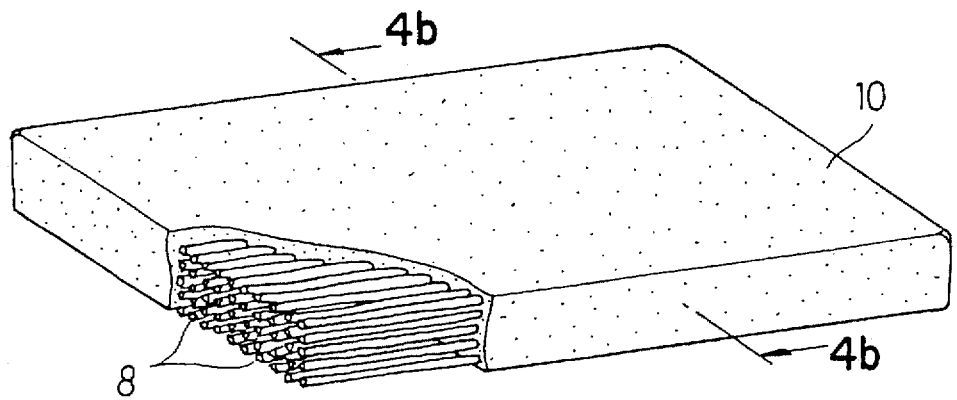
FIG. 4(a) is a perspective view showing first embodiment of woody strand cement board, and (b) is a cross sectional view taken along b—b line of (a)
Figure 4B:
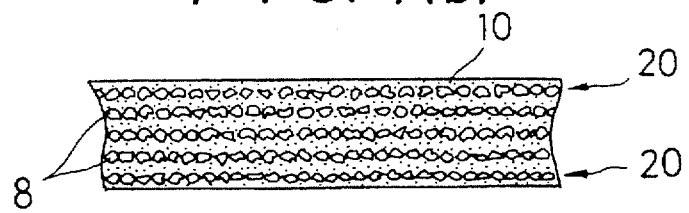

FIG. 4–7 are views showing the embodiments of the woody strand cement board of the present invention. FIG. 4 is a view showing a woody structural member (e.g.,) board made by solidifying and molding the finely split pieces aggregate piled by arranging the finely split pieces 8 in parallel to a fiber direction by a mortar 10. The finely split pieces aggregate making a bone of this cement board is formed by piling in multiple stages the single layers 20 formed by arranging in parallel the finely split pieces 8 together with the mortar. Accordingly, as shown in sectional view, each finely split piece 8 is made to a state buried into the mortar 10.

Figure 5A:
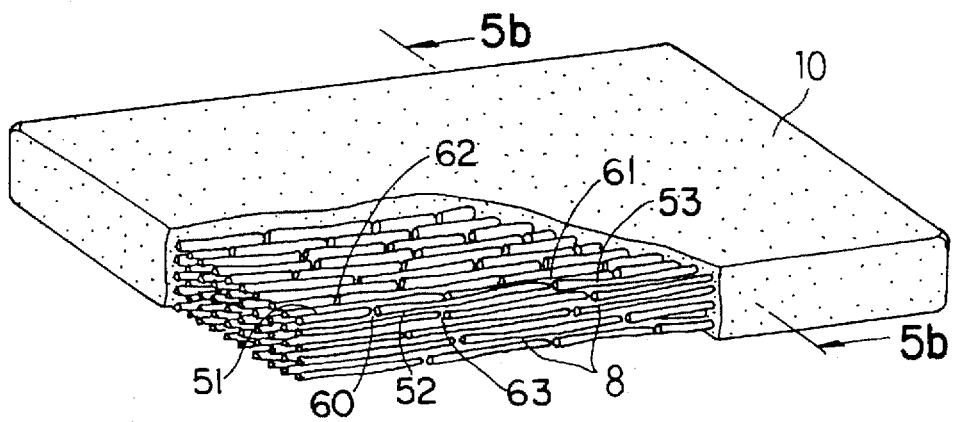
FIG. 5(a) is a perspective view showing second embodiment of woody strand cement board, and (b) is a cross sectional view taken along b—b line of (a)
Figure 5B:
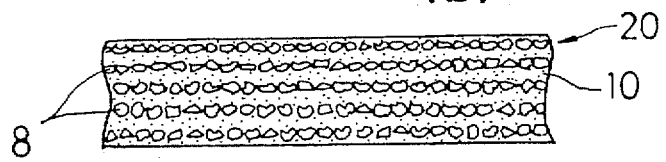

FIG. 5 is a view having a structure same as the woody strand cement board shown in FIG. 4, but short sized finely split pieces 8 are used.

The pieces (e.g., elongated members) 8 are arranged substantially collinearly in corresponding paths, and separated by gaps in each path. For example, in the top layer of the board, pieces 51, 52, and 53 are arranged collinearly in a common path. Pieces 51 and 52 are separated by a gap 60, pieces 52 and 53 are separated by a gap 61, and so forth. Within a layer, gaps in adjacent rows are offset from one another in the direction of the paths. For example, gap 60 is offset from a gap 62. Additionally, gaps in adjacent layers are offset in the direction of the paths. For example, gaps 60 is offset from gap 63.

Figure 6A:
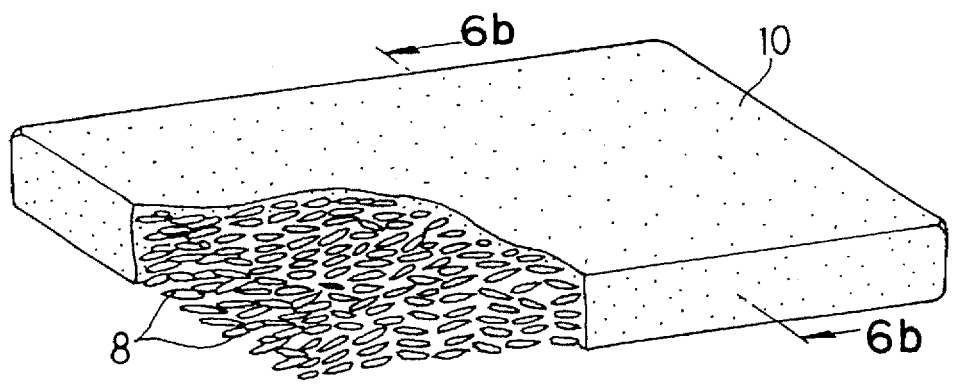
FIG. 6(a) is a perspective view showing third embodiment of woody strand cement board, and (b) is a cross sectional view taken along b—b line of (a)
Figure 6B:
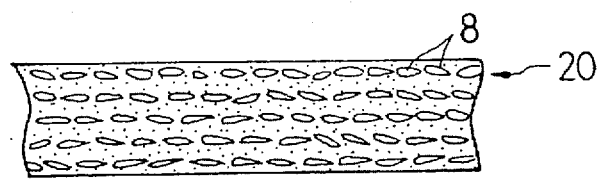

FIG. 6 shows a woody strand cement board formed by piling in random short sized finely split pieces 8 together with the mortar 10. In this case as well, a cement board of predetermined thickness is formed by piling the single layers 20 spread in random the short sized finely split pieces 8 together with the mortar 10.

Figure 7A:
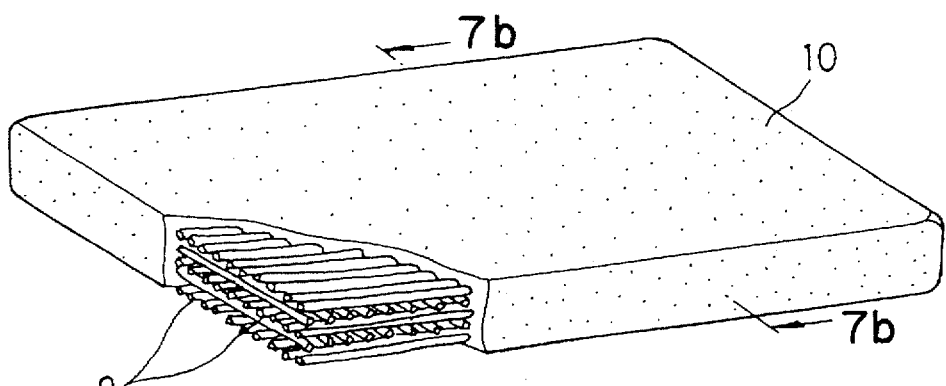
FIG. 7(a) is a perspective view showing fourth embodiment of woody strand cement board, and (b) is a cross sectional view taken along b—b line of (a)
Figure 7B:
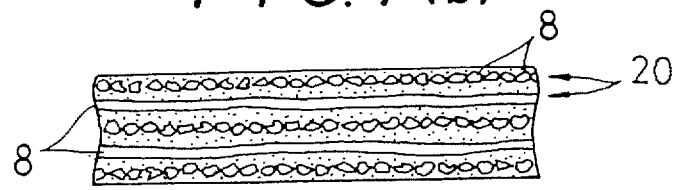

FIG. 7 shows a cement board formed so as to cross the fiber directions of the finely split pieces 8 of each single layers 20 piled.

Since the woody strand cement board shown in FIG. 4-7 are manufactured by aforementioned method, whole surface is covered by a mortar, but in order to obtain further more fire resistivity, it is preferred to form a mortar layer to a predetermined thickness further to its whole surface.

Following table 1 shows results of performance test of aforementioned woody strand cement board.

structure of the manufacturing apparatus, and as shown therein, this manufacturing apparatus comprises a mold solidifying means 15, a first means 16, a second means 17, a finely split pieces molding device 18, and a mortar feeding means 19 and etc. In this embodiment, the mold solidifying means 15 includes a shown mold frame 9, not shown vibrating machine, and a pressure applying device etc. In this mold solidifying means 15, the single layers structured by the finely split pieces are piled together with the mortar, and a vibration is applied and then pressed.

TABLE 1

| Sample No. | Wood finely split piece | | Weight ratio (manufactured time) | | Applied pressure (kgf/m²) | Product according to the present invention | | Strength test | | Heating test | |
|---|---|---|---|---|---|---|---|---|---|---|---|
| | length (mm) | mode of arrangement | cement/ sand | mortar/ wood finely split piece | | thickness (mm) | specific weight | Yong's coefficient (10³ kgf/cm³) | bending strength (kgf/cm²) | carbonizing (%) | carbonizing (mm/m) |
| 1 | 600 | parallel | 1:0 | 13.3 | 5 | 25 | 1.33 | 74 | 265 | | |
| 2 | 600 | parallel | 1:0.5 | 9.2 | 5 | 24 | 1.24 | 73 | 268 | | |
| 3 | 600 | parallel | 1:0.5 | 12.1 | 5 | 30 | 1.40 | 62 | 225 | 40 | 0.40 |
| 4 | 600 | parallel | 1:0.5 | 17.5 | 5 | 39 | 1.54 | 52 | 197 | 26 | 0.36 |
| 5 | 600 | parallel | 1:1 | 11.5 | 5 | 30 | 1.37 | 66 | 214 | 50 | 0.48 |
| 6 | 150 | parallel | 1:0 | 11.4 | 5 | 25 | 1.35 | 24 | 97 | | |
| 7 | 150 | parallel | 1:0.5 | 20.2 | 5 | 34 | 1.60 | 62 | 79 | 27 | 0.32 |
| 8 | 150 | random | 1:0 | 7.5 | 5 | 28 | 0.80 | 36 | 25 | | |
| 9 | 150 | random | 1:0.5 | 20.2 | 5 | 35 | 1.59 | 97 | 51 | 39 | 0.42 |
| 10 | 150 | random | 1:1 | 16.7 | 5 | 35 | 1.60 | 98 | 57 | 38 | 0.42 |

The raw material of finely split piece used for aforementioned performance test was a hemp (moisture content rate 12.5%), and for the finely split pieces, two kinds of those were used which was 4 mm in thickness, 10 mm in width, 600 mm in length, and 4 mm in thickness, 10 mm in width, 150 mm in length. For the strength test, a bending test by means of centrally concentrating load system of 45 mm span was executed, and thereby a bending Young's coefficient and a bending strength values were obtained. In accordance with these test results, in case when the finely split pieces of 600 mm in length were piled to a fiber direction, in response to the ratio of cement : sand becoming to be lower, the value of the bending Young's coefficient and the bending strength become smaller, and in response to the ratio of mortar : finely split piece becoming to be higher, the strength becomes decreased. However, as it will be clear from the result of sample No.1-4 of table 1, its strength of any of them comes to 60-75% of the lumbered product, and its strength comes to 2.5-4 times when comparing to a conventional wood piece cement board.

Further, in case of using a finely split piece of 150 mm in length, the bending strength was remarkably decreased even if each finely split piece was spread in parallel to a fiber direction. Further, in case of piling such a short finely split pieces were piled in random, its strength was more decreased.

According to the heating test, those which gives an influence to a carbonizing rate and a carbonizing speed were the rate of the finely split piece and the mortar, and a thickness of sample its self. That is, the higher the rate of the mortar, the smaller the carbonizing rate, and the carbonizing speel also becomes slower. For instance, the carbonizing speed of sample No. 3 and 4 become to less than ½ of the wood.

Figure 8:
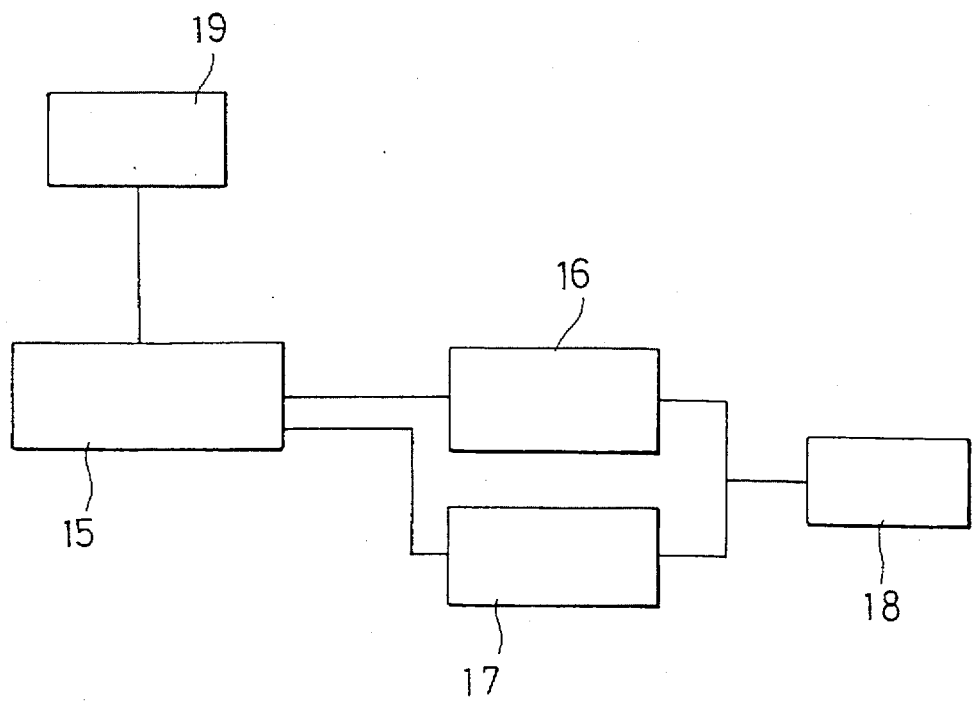
FIG. 8 is a block diagram showing a configuration of essential part of the manufacturing apparatus.

FIG. 8-12 are views showing the embodiments of the manufacturing apparatus. FIG. 8 is a view showing a basic The first means 16 and the second means 17 are devices for forming the single layer by feeding the finely split pieces to the mold frame 9 of the mold solidifying means 15, and respectively includes a plurality of transferring means.

The finely split piece forming device 18 is a device for manufacturing the finely split pieces by splitting the raw material of tree and bamboo etc., and in this embodiment, a device of aforementioned U.S. Pat. No. 5,505,238 is used. The mortar feeding means 19 includes a mortar tank, a feeding hose, and a nozzle etc., and the mortar is spread to the single layer of the finely split piece formed to the mold frame 9.

The finely split pieces manufactured at the finely split pieces forming device 18 are transferred to the mold solidifying device 18 by the first means 16 and the second means 17 whereby forming the single layer, and piled together with the mortar. And, a predetermined woody strand cement board is completed via the processes of pressure applying and drying.

Figure 9:
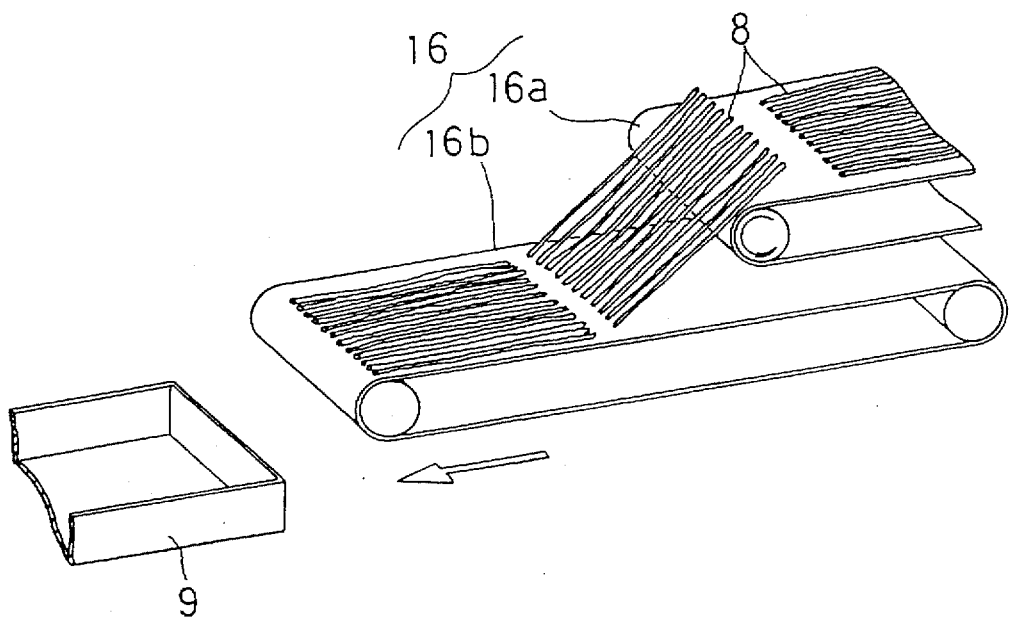
FIG. 9 is a perspective view showing an operation at a time when a forming conveyor of first means advances.
Figure 10:
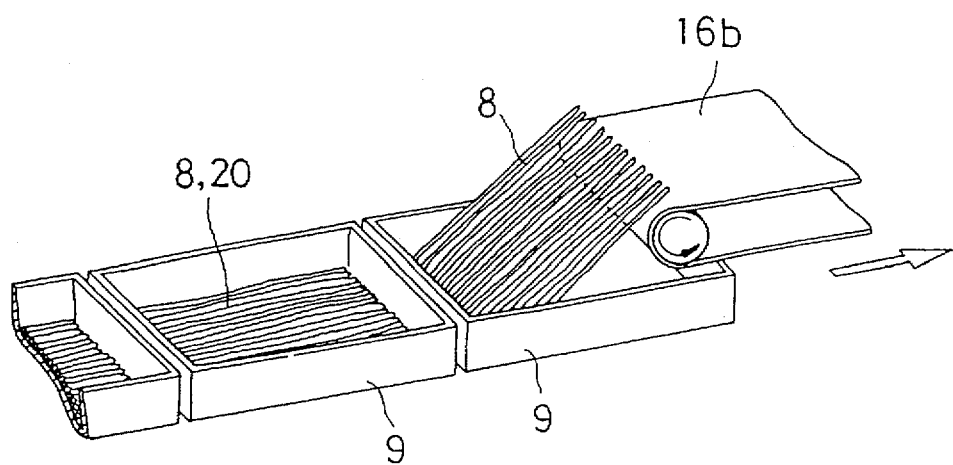
FIG. 10 is a perspective view showing an operation at a time when the forming conveyor of first means retreats.

FIG. 9 and FIG. 10 are views showing an essential part of the first means 16 and its operation. In the drawings, a reference numeral symbol 16a is a forming conveyor for transferring each finely split piece 8 to a fiber direction by arranging to the fiber direction, a numeral 16b is a swing conveyor which receives each finely split piece from aforesaid forming conveyor 16a and transfers to the molding frame 9 whereby forming a single layer within the molding frame 9. The swing conveyor 16b is provided so as to be able to advance and retreat against the molding frame 9. In FIG. 9, the swing conveyor 16b advances toward the molding frame 9 with receiving each finely split piece 8 from the forming conveyor 16a. At this moment, a belt of the swing conveyor is in a state of rotation stop.

The swing conveyor 16b stops an advance when it is reached a predetermined position on the molding frame 9. Successively, as shown in FIG. 10, it retreats from the molding frame 9 in response to the rotation of belt of the swing conveyor 16b. A single layer 20 according to the finely split piece 8 is formed to the molding frame 9 by such an operation. When the single layer 20 is formed, the mortar is spread on the single layer 20 from the mortar feeding means 19.

Figure 11:
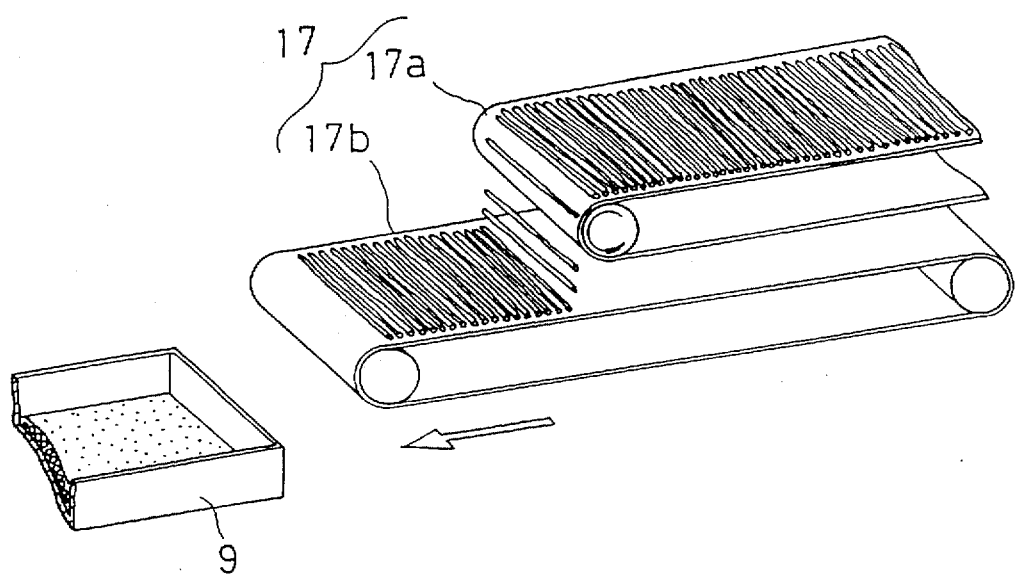
FIG. 11 is a perspective view showing an operation at a time that the forming conveyor of second means advances.
Figure 12:
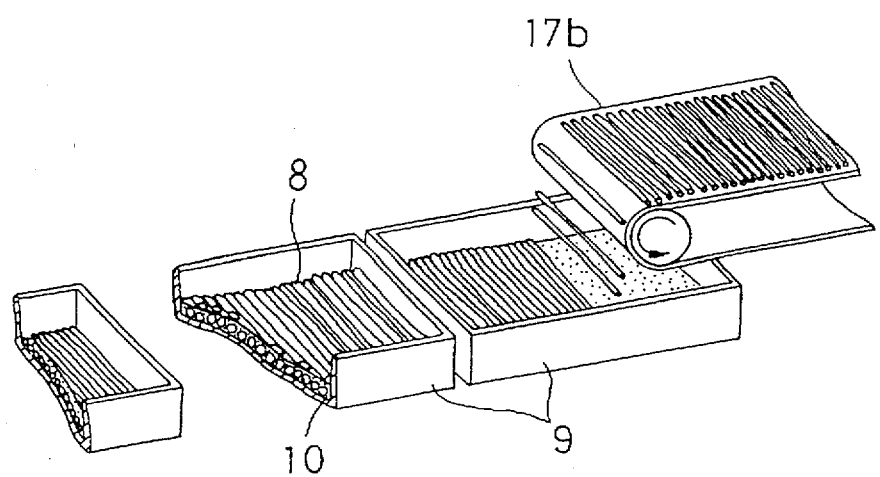
FIG. 12 is a perspective view showing an operation at a time that the forming conveyor of second means retreats.

FIG. 11 and FIG. 12 are views showing an essential portion of the second means and its operation, and its explanation will be omitted because it is same as aforesaid first means. By the second means, it is possible to form the single layer 20 of structure different from the first means. FIG. 11 and FIG. 12 show the case of forming a single layer 20 in which a fiber direction of the finely split piece 8 crosses with the single layer 20 according to first means.

Figure 13:
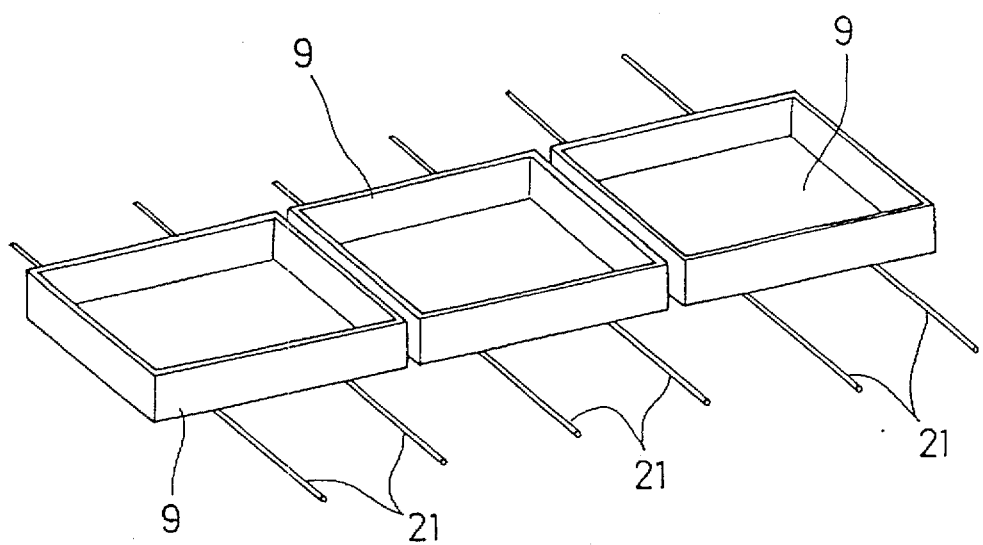
FIG. 13 is a perspective view showing a molding frame and rails as its moving means.

Further, the finely split piece 8 in the second means may be disposed in random without arranging each to a fiber direction. Further, the molding frame 9 is made so as to be able to reciprocate between the first means and the second means by moving on rails 21 as shown in FIG. 13. According to this, a single layers 20 of different structure can be alternately piled. The operation of various structure elements of this apparatus is controlled by a general means such as microcomputer and the like.

What is claimed is:

1. A woody structural member, comprising:

at least first and second layers each comprising a plurality of elongated split members obtained by splitting a woody material along a fiber direction, said plurality of elongated members in said first and second layers being arranged substantially parallel to one another in respective paths, each path in said first and second layers having at least two elongated members arranged substantially collinearly therein and being separated by a corresponding gap, with the gaps between the elongated members in the paths of said second layer being offset relative to the gaps between the elongated members in corresponding paths of said first layer; and mortar for covering said elongated members;

said mortar being molded and solidified to a predetermined shape.

2. The structural member of claim 1, wherein:

at least some of said plurality of elongated members extend substantially an entire length of said structural member.

3. The structural member of claim 1, wherein said plurality of elongated members are arranged in a substantially random fashion relative to one another.

4. The structural member of claim 1, wherein said woody material comprises at least one of wood, bamboo, and reed.

5. The structural member of claim 1, further comprising:

a second layer adjacent to said first layer comprising a plurality of elongated split members obtained by splitting a woody material along a fiber direction.

6. The structural member of claim 5, wherein said plurality of elongated members in said first and second layers are arranged substantially parallel to one another.

7. The structural member of claim 5, wherein:

said plurality of elongated members in said first layer are arranged substantially parallel to one another;

said plurality of elongated members in said second layer are arranged substantially parallel to one another; and said plurality of elongated members in said second layer are arranged substantially transverse to said plurality of elongated members in said first layer.

8. The structural member of claim 1, wherein said plurality of elongated members have a cross-sectional width of at least approximately 4 mm.

9. The structural member of claim 1, wherein said plurality of elongated members have a cross-sectional width of approximately 4 mm to approximately 10 mm.

10. The structural member of claim 1, wherein said predetermined shape is a board.

11. The structural member of claim 1, wherein:

the gaps in adjacent ones of said paths in each of said first and second layers are offset relative to one another.

12. The structural member of claim 1, wherein:

said mortar comprises a mixture of cement and sand having associated weights; and a ratio of the weight of said cement to the weight of said sand is selected to provide a desired strength characteristic of said structural member.

13. The structural member of claim 1, wherein a volume of said mortar in said first layer is approximately ⅓ to approximately ⅔ a volume of said first layer.

14. The structural member of claim 1, wherein said mortar is formed by cement, sand, and water contained in the elongated members.

15. The structural member of claim 1, wherein:

said mortar comprises cement, sand, and water; and an amount of said water is adjusted according to a moisture containing rate of said elongated members.

16. The structural member of claim 1, wherein:

said elongated members having an associated weight;

said mortar has an associated weight; and a ratio of said weight of said plurality of elongated members and said weight of said mortar is selected to provide a desired strength characteristic of said structural member.

17. The woody structural member of claim 16, wherein:

said desired strength characteristic is Young's coefficient.

* * * * *